(12) United States Patent
Chen

(10) Patent No.: US 6,722,623 B1
(45) Date of Patent: Apr. 20, 2004

(54) MULTI-STAGE PEDAL VALVE STRUCTURE

(76) Inventor: Kent Chen, 15th Fl., No. 2, Guoding 1st St., Taoyuan City, Taoyuan (TW)

( * ) Notice: Subject to any disclaimer, the term of this patent is extended or adjusted under 35 U.S.C. 154(b) by 0 days.

(21) Appl. No.: 10/189,227

(22) Filed: Jul. 5, 2002

(51) Int. Cl.[7] ............................................. F16K 31/00
(52) U.S. Cl. ....................................... 251/66; 251/295
(58) Field of Search ............................... 251/295, 213, 251/66, 72, 73, 74

(56) References Cited

U.S. PATENT DOCUMENTS

| | | | | |
|---|---|---|---|---|
| 5,309,941 A | * | 5/1994 | Lin | 251/295 |
| 5,421,552 A | * | 6/1995 | Wang et al. | 251/295 |
| 5,464,190 A | * | 11/1995 | Chang et al. | 251/295 |
| 6,345,806 B1 | * | 2/2002 | Chen | 251/295 |

* cited by examiner

*Primary Examiner*—John Bastianelli
(74) *Attorney, Agent, or Firm*—Harrison & Egbert

(57) ABSTRACT

A multi-stage pedal valve structure relates to a flow regulator on the valve opening located between the two compartments inside the body of the one-way pedal valve. The device includes a valve jacket, a piston rod, a graduating disc and a spring, while the valve jacket possesses a concave channel guide and a one-way tilting wedge. The graduating disc is a cylindrical unit on the opposite of the valve jacket. The piston rod comes in the form of a trapezoid, of which the outer section increases from top to bottom, and the middle section of the piston rod features circular channels, of which the end and the lower section come in increasing pitches and the perimeter of the lower section comes with slant blocks in reduced numbers and in even numbers in proportion to the channels on the valve jacket. The device keeps water from flowing.

1 Claim, 3 Drawing Sheets

MULTI-STAGE PEDAL VALVE STRUCTURE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

A kind of multi-stage pedal valve structure having a pedal on a piping for the control of flow that is duly set in stages, being the creation of a valve assembly and a pedal, consisting the valve assembly of a body, a cover, a piston rod, a spring, a positioning valve jacket, a graduating disc and base; where the positioning valve jacket, the graduating disc and the piston rod form the height controller for the graduating piston rod, which regulates water flow together with the peripheral concave channel guide along the piston rod.

BACKGROUND OF THE INVENTION

The commonly known One-way Pedal Valve structure comes with a pair of parallel water inlet/outlet in association with interlocked compartments extending outside the left and right compartments, having the top and lower cover with the left and right compartments formed by the closing top and bottom covers, and the two compartments are linked with a valve opening provided with a valve jacket featuring a piston rod sustained by a piece of spring on its bottom. The valve jacket indicated above is fastened by the top cover into the valve hole and the middle section of the piston rod is inserted in the valve jacket. The top of the valve jacket protrudes the top cover and is pushed by the pedal that controls the lower part of the piston rod to open or close the bottom opening as a way to regulate the water flow. In another word, when the pedal is pressed, the valve opens to release water and, when the pedal is released, the valve closed automatically and stops the water flow.

BRIEF SUMMARY OF THE INVENTION

The multi-stage pedal valve structure, hereinafter referred to as This Invention, relates to the flow regulator on the valve opening located between the two compartments inside the body of the one-way pedal valve. The device is equipped with a valve jacket, a piston rod, a graduating disc and a spring, while the valve jacket possesses a concave channel guide and a one-way tilting wedge. The graduating disc is a cylindrical unit on the opposite of the valve jacket from which it is spaced and, having the graduating disc groves in even numbers and between the two compartments, there is a one-way tilting wedge, although the grooves on the graduating disc correspond to the tilt wedge on the valve jacket. The piston rod comes in the form of a trapezoid, of which the outer section increases from top to bottom, and the middle section of the piston rod features circular channels, of which the end and the lower section come in increasing pitches and the perimeter of the lower section comes with slant blocks in reduced numbers and in even numbers in proportion to the channels on the valve jacket, and the slant block on the lower section moves back and forth between the valve jacket and the graduating disc with the slant block. With the slant block moving from the cell in front of the concave channel on the valve jacket to the next concave cell to form different numbers of releases of the channel in the middle section of the piston rod because of different elevations of the adjacent concave channels, the device keeps water from flowing.

Together with the embodiments given in the figures indicated below, the construction and features of this invention are presented as follows.

DETAILED DESCRIPTION OF THE INVENTION

Figure 1:
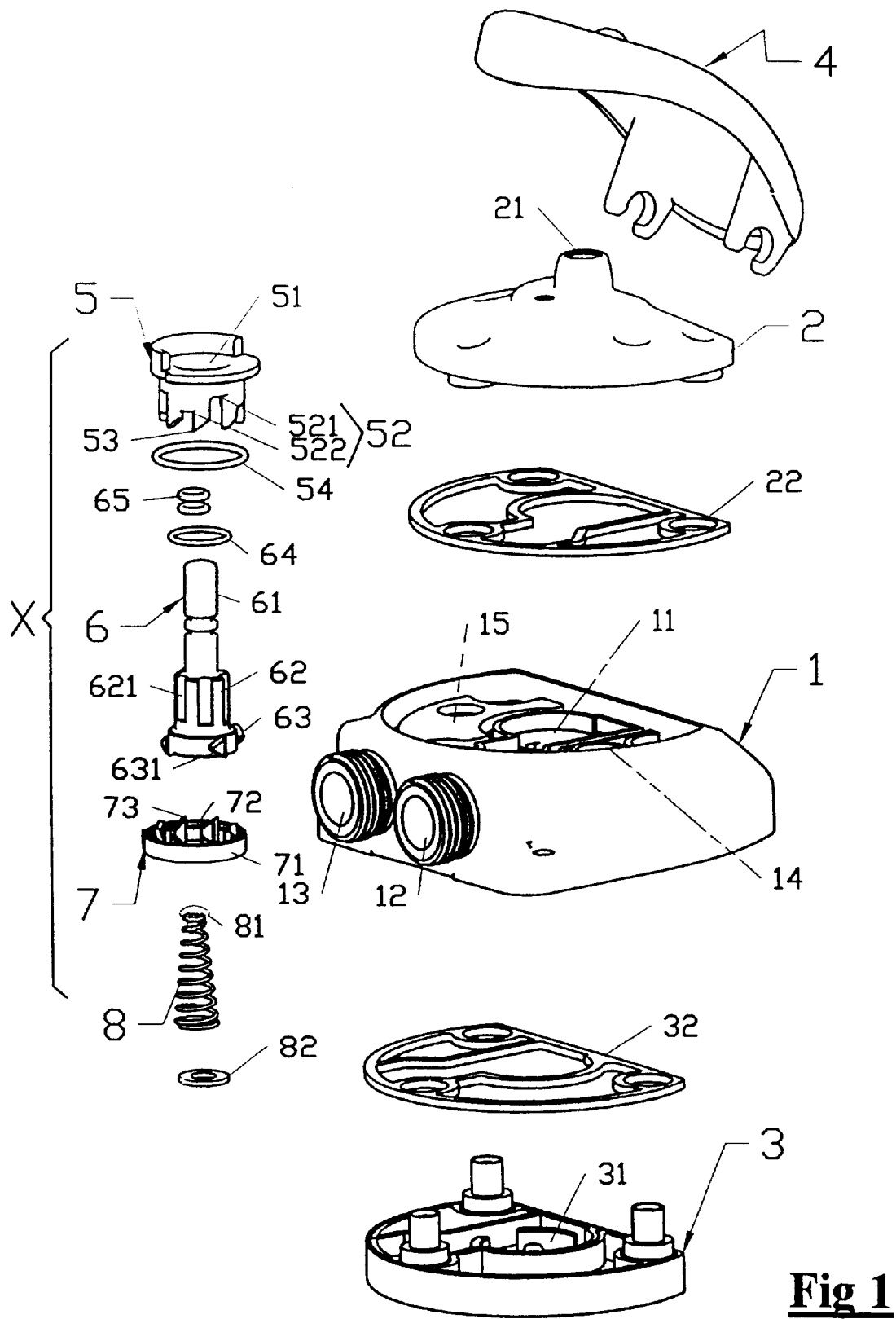
FIG. 1 is an exploded perspective view of the elements of this invention.

This invention relates to the modification of the basic structure of the aforementioned one-way pedal valve, allowing water release in the first stage when positioned by stepping the pedal once and, into the second stage by stepping the pedal another time, thus completing the first cycle of opening and closing the valve, having the key elements, as indicated in FIG. 1, as body (1), upper cover (2), base (3) and pedal (4) and a flow controller (X) consisting of a the valve jacket (5), a piston rod (6), a graduating disc (7) and a spring (8). The body (1) has a flow passage formed by the 2 parallel compartments (14, 15) and the water inlet/outlet (13, 12) with the valve opening (11) between the two compartments. On top of the valve opening (11) in the middle of the upper cover (2), there is a through hole (21) and the middle of the bottom cover (3) is used as graduating pit (31). On the interface of the upper cover (2), the bottom cover (3) and the body (1), there is a rubber washer (22) (32) for watertightness and the pedal is located on top of the upper cover as an element swinging up and down; the flow controller (X) comes with a valve jacket (5), a piston rod (6), a graduating disc and a spring. Said valve jacket (5) is secured in the valve hole (11), where there is a through hole (51) in the middle and in the bottom there is a concave channel (52), allowing neighboring channels (521, 522) be arranged from a higher level to a lower one, the piston rod (6) comes in 3-level trapezoid, where the top section (61) comes in the shortest diameter, followed by the middle section (62) and then the bottom section (63); said top section (61) slides onto the hole (21) of the middle section (2), where the lower graduating disc (7) is secured onto the graduating pit on the base and the top of the spring (8) is sustained on the bottom of the piston rod (6) and the bottom of the spring (8) seats on the bottom cover (3), allowing the piston rod (6) return upward.

Figure 3:
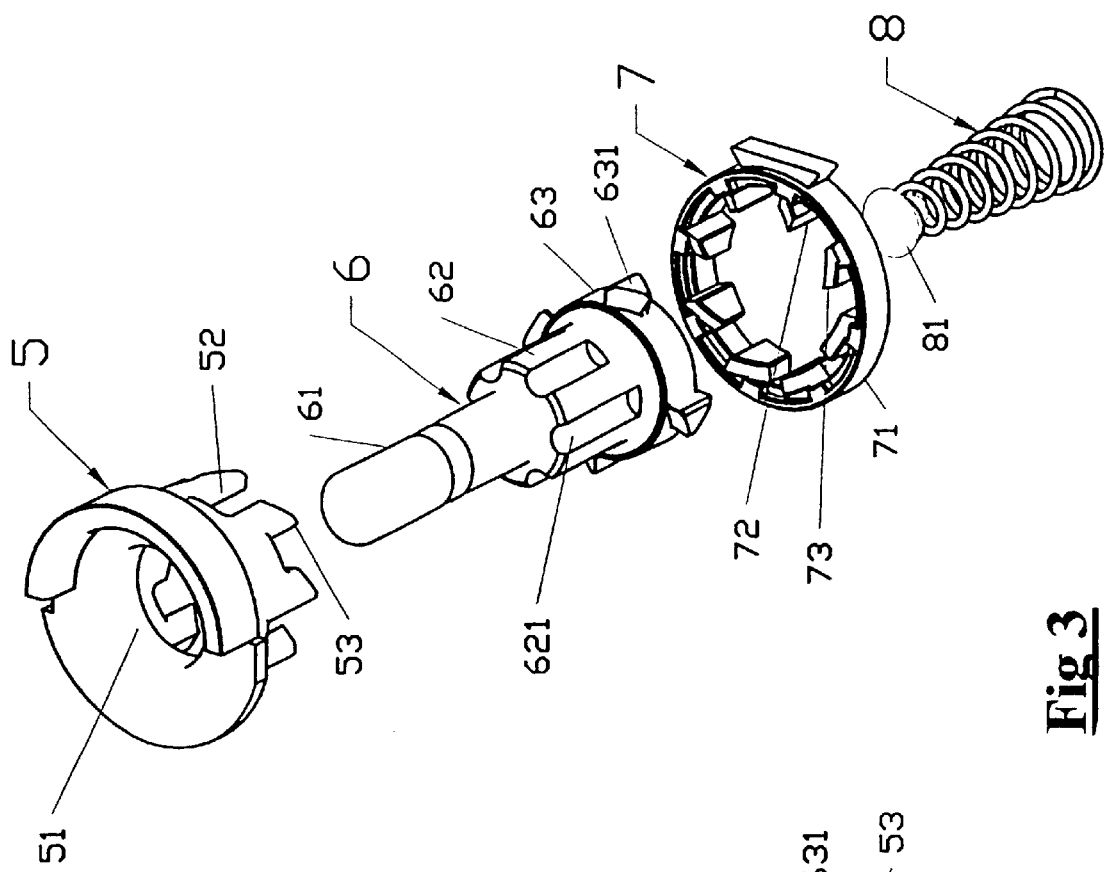
FIG. 3 is an exploded perspective view of the flow controller of the embodiment of this invention.
Figure 3:
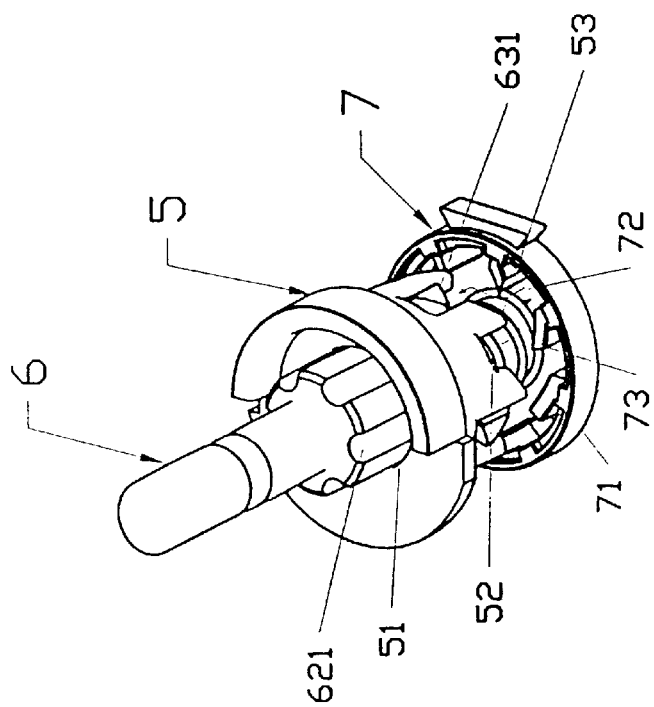

As the elements of this invention shown in FIG. 1, an assembled structure is given in FIG. 3, where on the valve hole (11) between the two compartments (14, 15) formed by the upper cover (2) and the base (3), the flow controller formed by the valve jacket (5), piston rod (6), graduating disc (7) and the spring (8) is to set the volume of water flow. As shown, the valve jacket is secured into the valve hole (11) and the hole (51) between the valve jackets (5) is available for water flow between the two compartments (14, 15), the graduating disc (7) is in the graduating pit (31) on the bottom cover, having the top of the ring be pressed and secured, the slant wedge (73) on the graduating disc (7) corresponds to the concave channel (52) below the valve jacket (5), and the piston (6) slides into the valve jacket hole (51), the top section protruding from the upper cover hole (21) and the middle section engaged into the valve jacket hole (51), and the groove passes through the 2 compartments (14, 15) with the piston rod (6) moving downward, and the flow volume through the groove (621) depends mainly on the piston rod that moves down and the slant block (631) below the piston rod is confined between the groove (52) and the channel (72) and the valve jacket (5) and the graduating disc (7).

Figure 2:
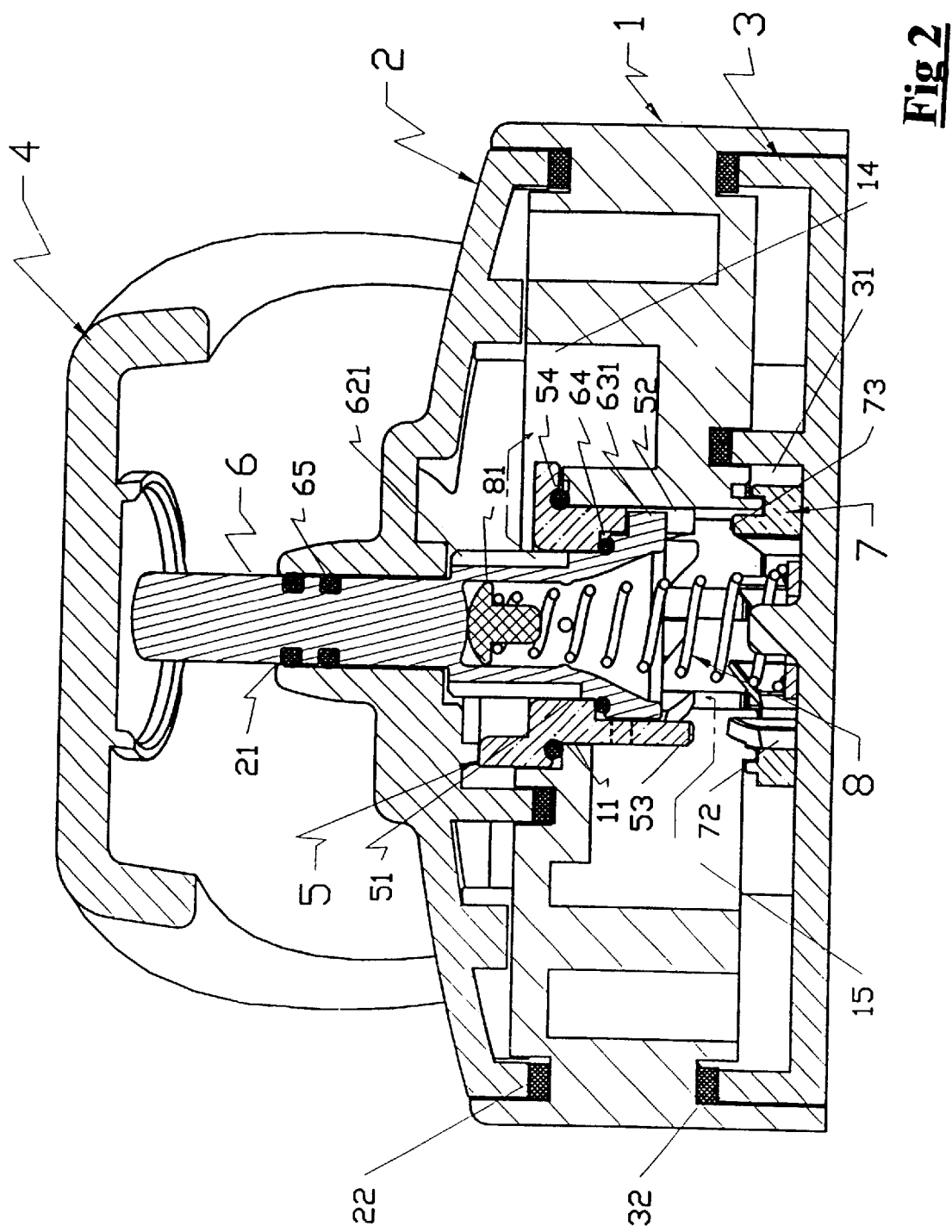
FIG. 2 is a vertical cross-sectional view of the structure of the embodiment of this invention.

The flow controller (X) assembly is shown in FIG. 3: where the channel on the bottom of the valve jacket (5) is interlocked with the jacket of the graduating disc (7), having the end of the channel of the valve jacket a slant wedge (53), of which the surface has a one-way slant surface rotating allow the core and the protruding block between the two channels (72) on the graduating disc (7) has its top end as a slant wedge (73), of which the surface tilts in the direction of the rotating valve wedge, though the angle is set accordingly. Around the middle section (62) of the piston rod (6) there are grooves from top to bottom and the groove (621) is provided as flow passage, the lower section (63) has slant blocks (631), on which, there is a slant surface both on the top and the bottom, opposing the valve jacket slant wedge (53) and the one (73) on the graduating disc; having the graduating disc (73) on its perimeter a ring (7) with the inner circumference channels (7) and slant wedges in the same number that of the valve jackets (5). Between said graduating disc (7) and the valve jacket (5) there is a proper clearance that allows the slant block (631) of the piston rod (6) pass smoothly as the lowest level; as shown in the left figure of FIG. 2, the channel (52) on the valve jacket (5) corresponds to the slant wedge (73) of the graduating disc (7), that is to say, the slant wedge (53) corresponds to the channel (72) of the graduating disc (7), and when the piston rod (6) is pressed down once, the slant wedge (631) on the piston rod (6) moves in the direction of the arrow and when it skips to the next level of the valve jacket channel (52), with the concave channel (52) in cyclic and circular allocation, every time the piston rod (6) is positioned, it sets the upper channel (621) of the piston rod (6) in the valve jacket hole (51) in different numbers (the channel (621) is allocated in graduating levels), allowing it to control water flow in different flow volumes.

The invention referred in the patent application relates to an invention featuring a scaled water flow control, which is fully applied in the slim one-way pedal valve launched by the inventor, as a kind of multi-stage pedal valve water controller for long-time water release.

I claim:

1. A multi-scale pedal valve structure comprising a body, an upper cover, a bottom cover, a pedal and a set of flow controllers, two body compartments on a left and right side of said body, a pair of water inlet/outlet at an end, said two compartments being connected through a vertical valve hole, said upper cover and the bottom cover opening with the body, allowing the compartments to become watertight;

wherein a flow controller on the valve opening between the compartments, further comprises a valve jacket, a piston rod, a graduating disc and a spring, where a perimeter of the valve jacket is comprised of channels in arrangement from top to bottom and a one-way slant wedge between the two compartments, the channels on said graduating disc corresponding to the slant wedge on the valve jacket;

wherein said piston rod comes in a trapezoidal form, having the outer diameter enlarging from top to bottom, and wherein a perimeter of a middle section of the piston rod comprises circular channels and pitch between an end of the channel and the lower section increases gradually and wherein a perimeter of the lower section comprises slant blocks in gradually decreasing numbers or numbers equaling to the channel on the valve jacket, the slant block on the lower section movable between the valve jacket and the graduating disc and movable from the cell in front of the valve jacket channel to the next one with the slant block moving back and forth and, owing to the different level of the adjacent channels, creating different numbers of releases of the channel openings in different levels of the middle section of the piston rod, thus keeping water from flowing.

* * * * *